United States Patent [19]

Lapeyre et al.

[11] Patent Number: 5,361,893
[45] Date of Patent: Nov. 8, 1994

[54] HIGH FRICTION PLASTIC CONVEYOR BELTS HAVING MODULAR LINKS FORMED BY TWO INTEGRATED PLASTIC MATERIALS

[75] Inventors: Robert S. Lapeyre, New Orleans; John J. Carbone, Metairie, both of La.

[73] Assignee: The Laitram Corporation, New Orleans, La.

[21] Appl. No.: 153,979

[22] Filed: Nov. 18, 1993

[51] Int. Cl.$^5$ ............................................. B65G 17/06
[52] U.S. Cl. .................... 198/853; 198/851; 198/690.2
[58] Field of Search ................ 198/849–853, 198/688.1, 690.2; 425/406, 407, 408, 384, 390, 412

[56] References Cited

U.S. PATENT DOCUMENTS

| | | | |
|---|---|---|---|
| 1,414,212 | 4/1922 | Samuelson | 198/850 |
| 1,855,808 | 4/1932 | Schwan | 198/847 |
| 2,792,928 | 5/1957 | Holz | 198/853 |
| 2,909,271 | 10/1959 | Taylor | 198/690.2 |
| 2,951,578 | 9/1960 | Hibbard | 198/848 |
| 3,046,806 | 7/1962 | Collins | 198/853 X |
| 3,514,941 | 6/1970 | Mueller | 198/853 X |
| 3,661,245 | 5/1972 | Mol et al. | 198/847 X |
| 3,756,382 | 9/1973 | Adey, Jr. et al. | 198/690.2 |
| 3,857,478 | 12/1974 | Meeusen | 198/690.2 |
| 3,904,028 | 9/1975 | Muller | 198/850 |
| 4,643,297 | 2/1987 | Krieger et al. | 198/853 X |
| 4,951,457 | 8/1990 | Deal | 198/850 X |
| 5,125,504 | 6/1992 | Corlett et al. | 198/850 |

FOREIGN PATENT DOCUMENTS

| | | | |
|---|---|---|---|
| 0162413 | 9/1983 | Japan | 198/851 |
| 2164313 | 3/1986 | United Kingdom | 198/853 |
| 2185725 | 7/1987 | United Kingdom | 198/851 |

*Primary Examiner*—James R. Bidwell
*Attorney, Agent, or Firm*—Laurence R. Brown

[57] ABSTRACT

A plastic conveyor belt system provides high frictional surface contact between the conveyor work surface and the load carried by the conveyor. This is achieved by modular belt links integrally formed of two diverse plastic materials such as a low friction polypropylene and a high friction elastomer thermoplastic rubber. Typically a belt modular link having a planar load support area disposed in its lower forming mold piece with an upper mold piece removed to expose the planar area. Then a further mold piece is mated with the lower mold piece to integrally join by thermal bonding the two diverse materials producing on the planar link load bearing surface area an elastomer strip with an outer frictionally textured surface for encountering the belt load.

13 Claims, 2 Drawing Sheets

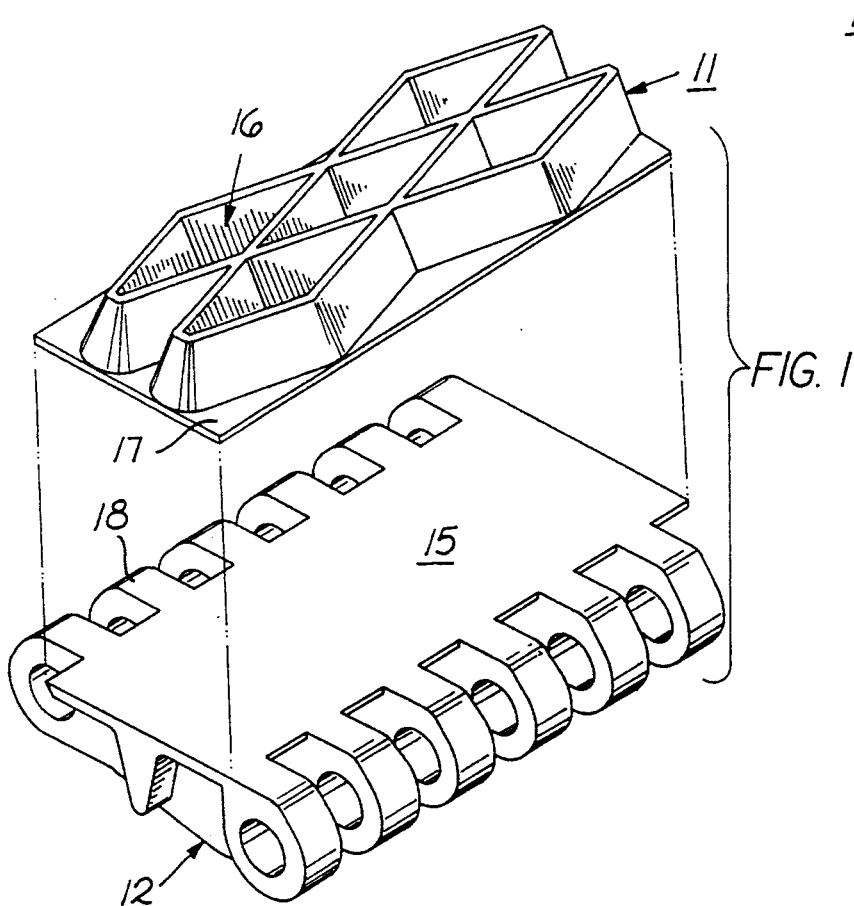
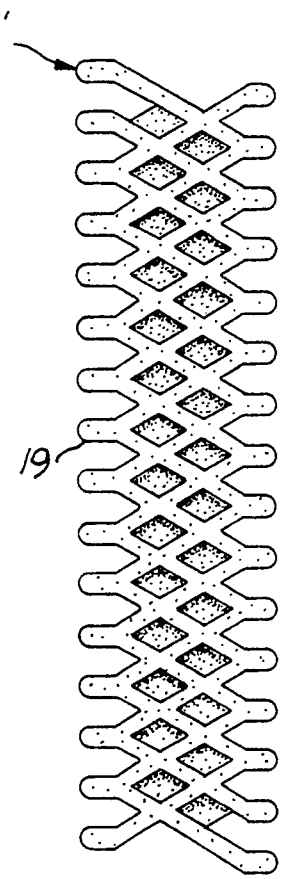
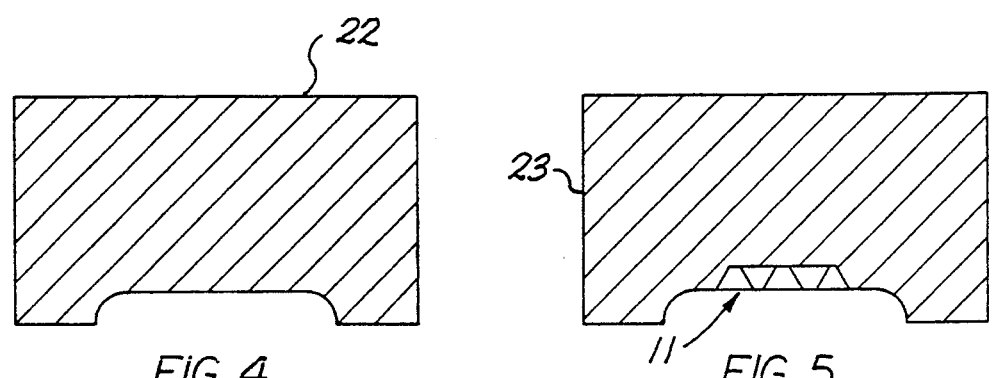
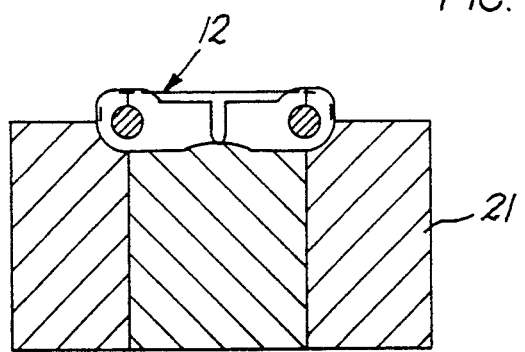
FIG. 1
FIG. 2
FIG. 4
FIG. 5
FIG. 3

HIGH FRICTION PLASTIC CONVEYOR BELTS HAVING MODULAR LINKS FORMED BY TWO INTEGRATED PLASTIC MATERIALS

TECHNICAL FIELD

This invention relates to plastic modular conveyor belts and more particularly it relates to conveyor belts with plastic modular links integrally formed of two different plastic or rubber materials.

BACKGROUND ART

Modular plastic links for conveyors are typically formed of polyethylene, polypropylene or acetal, which are hard, wear resistant plastics having a low coefficient of friction ideal for pivoting the links and frictional contact with wear strip surfaces. These plastics also provide a high tensile strength along the belt for conveying heavy loads and ideal chemical and biological inactivity for use of the belts in sanitary and chemical environments. However, the low friction characteristics of the plastics do not form an ideal belt-to-load surface for carrying loads up and down inclines.

In the prior art, fabric and rubber-like belts have been used extensively to increase the friction of the carrying surface of the belts. However, these belts have certain shortcomings. Because significant friction between a fabric belt and its driving drum is required to effectively drive the belt, fabric belts are maintained in high tension, even while not operating. The high tension stretches the belt and strains the conveyor frame and tensioner. Another shortcoming with fabric belts is that they are not positively tracked, making them susceptible to edge damage as the untracked belt wanders from side to side. Repair is another problem with fabric belts. Removing worn sections, inserting splices, determining the correct length, and reinstalling and retensioning the repaired belt can be difficult. Furthermore, the roller carryways used with fabric belts are noisy.

It is therefore a primary object of this invention to resolve these problems by manufacture of high friction link belt modules and to provide improved high friction conveyor belts and conveyor systems.

DISCLOSURE OF THE INVENTION

In accordance with this invention modular plastic link belts are made with high friction surfaces by providing integral modular links bonding together two different plastic or rubber materials. One material, typically an elastomer such as a thermoplastic rubber is disposed on the load transport surface to provide a high friction transport surface. The other material, typically acetal, polypropylene or polyethylene, forms a module with link ends for receiving pivot rods for coupling modules together end-to-end in a low friction, high strength, rigid belt assembly of fixed length for driving by sprocket wheel assemblies. The materials are thermally bonded by molding to form unitary modular link elements with a high friction load transport surface.

Further objects, features and advantages of the invention will be found throughout the following description, drawings and claims.

BRIEF DESCRIPTION OF THE DRAWINGS

In the accompanying drawings, wherein like reference characters refer to similar features throughout the various views to facilitate comparison:

FIG. 1 is an exploded perspective sketch of a modular belt link afforded by this invention having an integral body formed of two different materials, respectively characterized by low and high coefficients of friction;

FIG. 2 is a plan view of a high friction textured overlay pattern for forming a load carrying surface of a conveyor belt;

FIGS. 3 to 5 are respectively section sketches of a lower and two alternating upper mold pieces employed to integrally mold a modular belt link from two different materials in accordance with this invention;

THE PREFERRED EMBODIMENTS

Figure 6:
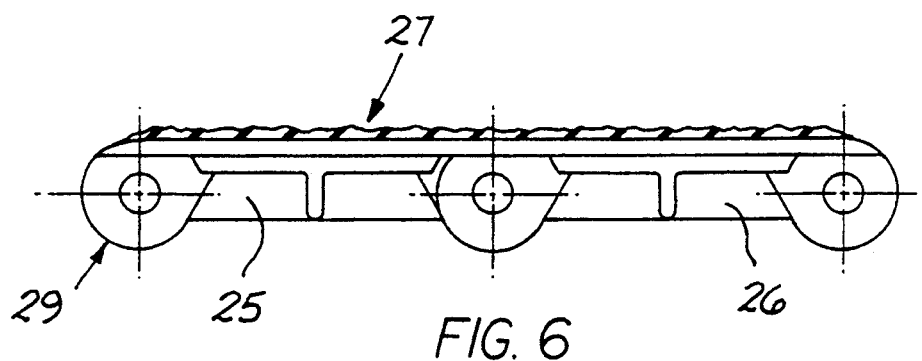
FIG. 6 is a side view sketch, partly in section, showing a fragment of a modular link belt with modular links pivoted together.

The modular link of FIG. 1 has the anti-skid conveyor load carrying surface member 11 and the link end carrying base member 12 formed of two separate materials bonded together integrally at the top surface interface 15. For functionally adapting the modular link element to resolve the aforesaid problems of the prior art, the base element 12 is formed of a strong, hard plastic material having a low coefficient of friction, typically acetal, polypropylene or polyethylene, and the surface member 11 is of an elastomer, typically a thermoplastic rubber having a high coefficient of friction. The elements are bonded together at the interface surface 15 preferably by thermal injection molding.

The surface friction member 11 in one embodiment is textured to present an anti-slip high friction load carrying surface having diamond shaped ridges 16 extending upwardly from an unapertured carrying surface strip 17. When the friction member 11 is superimposed on the flat-top surface 15 of the base elements 12 connected pivotably end to end, there will be a gap between the strips 17 extending over the link ends 18 of the base elements 12.

However, the textured surface of the modified friction member 11' in FIG. 2 provides mating link end members 19 that will overlap and interdigitate with the link ends 18 to form a substantially continuous load bearing anti-slip surface over the length of the belt.

It should be appreciated that, although the embodiments shown have flat-top surfaces, it is also possible to have perforated or otherwise open-area belt modules for drainage or air flow.

The integral modular lines are molded in the manner represented by the mold pieces shown in FIGS. 3, 4 and 5. Thus the base member 12 resides in the lower mold half 21 after the upper die half 22 has been removed. Then the alternating die half 23 is mated with lower die 21 to thermally bond the surface member 11 to the flat upper surface of link 12, preferably by injection molding.

Figure 7:
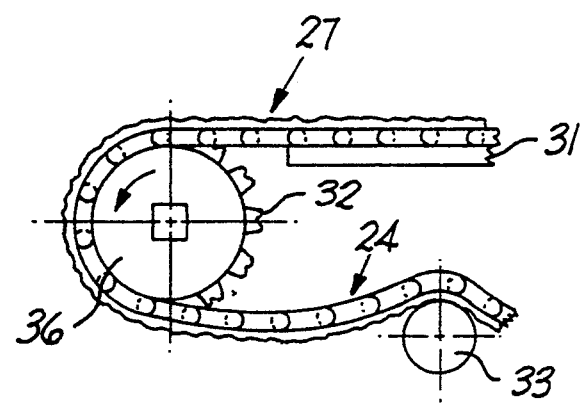
FIG. 7 is a fragmentary side view sketch of a sprocket driven conveyor belt system embodying the invention.

Belt systems constructed with interconnected finished modular links 25, 26, as shown in FIG. 6, representing a fragmental portion of a pivoted link conveyor belt 24 in FIG. 7, thus present an anti-slip upper load bearing transport surface 27 formed of the high friction material, and a lower link base of stronger and longer wearing hard plastic having lower friction. The low friction material of the base member 12 at the pivot zones 29 is crucial, as is the low friction interface at the wear plates 31 of the conveyor belt array of FIG. 7. Also the low friction interface of the sprocket teeth 32 with the hard plastic low friction material is crucial to belt wear and permits the use of more positive sprocket drive to replace rollers that were used heretofore with fabric belts necessary to provide high friction load carrying interfaces.

Since the softer resilient elastomeric material of the antislip surface 27 is more subject to wear, the lowermost return path of the link belt is passed over small diameter rollers 33 in embodiments where there must be contact with the high friction material. The resulting conveyor link belt system is not compromised in terms of pulling capacity or tensile strength with the construction of links as taught by this invention.

Figure 8:
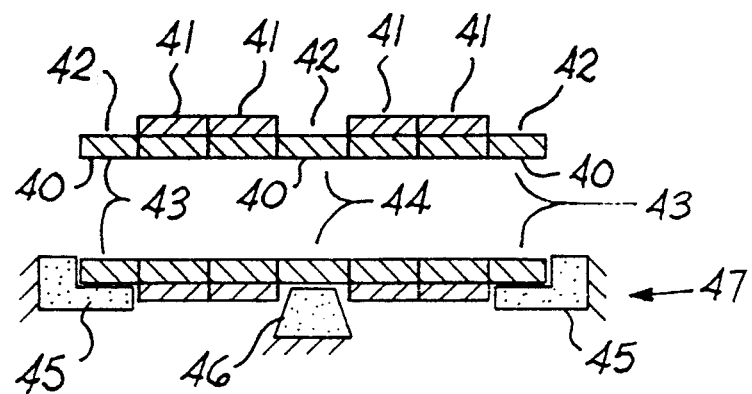
FIG. 8 is a cross-sectional elevational view of a conveyor embodying the invention showing an upper carryway and a lower returnway with the belt supported by wear strips in contact with low friction surface portions.

Another advantage of the modularity of the invention is that various patterns of high-friction surfaces can be arranged in constructing a conveyor belt. For example, as shown in FIG. 8, belt modules 40 lacking high-friction conveying surfaces can be bricklayed with modules 41 having high-friction surfaces in a loadbearing surface pattern characterized by low-friction bands 42 along the edges 43 or internal portions 44 of the belt. Stationary wearstrips 45 or shoes 46, rather than the moving roller 33 of FIG. 7, can be positioned along the return path 47 in line with the low-friction bands 42 to minimize friction and wear. Equivalently, modules can be molded with longitudinal gaps between high-friction surface material so that a conveyor belt having lowfriction longitudinal bands along the load-bearing side can be assembled.

A further significant advantage of this invention is the ease of repair of modular link belts simply by module replacement, which replaces the prior art practice of making of incompatible joints to connect ends of fabric belts together. The design of proper link belts is facilitated by the link construction, and the hard plastic is not subject to any extensive stretching or fatigue.

It is noted that with the shown construction the high friction material is not required to bend as it articulates about the sprocket assembly 36 of FIG. 7. Thus this system is superior to a drum drive fabric belt system, or any system superimposing a non-modular surface material along the length of a modular belt system.

This invention therefore provides in one embodiment a modular link for a plastic conveyor belt adapted to convey loads up and down inclined surfaces by way of a thermally bonded surface member 11 affixed unitarily to a basic modular link to serve as a high friction load transport body. Thus, surface member 11 is made of high friction elastomeric material that thermally bonds to form a unitary modular link with the basic plastic modular link body of base member 12. Thus a basic modular link formed of hard, wear resistant plastic material having a low coefficient of friction with a shape presenting a load carrying surface with a substantially planar load bearing area 15 is converted into a high friction modular link capable of carrying loads up and down an inclined surface. The hard plastic region serving as interface surface 15 forms a thermal bond with dissimilar compressible thermoplastic frictional materials to produce a unitary modular conveyor belt link of different load bearing characteristics. These links when coupled end-to-end form a belt of predeterminable fixed length that retains high longitudinal belt strength and low friction contact surfaces for belt transport bearing surfaces and pivot joints. Improved conveyor belt systems using these modules function over a wide range of loading requirements including transport up and down inclined surfaces.

The high friction load transport body encompasses substantially the entire load bearing area of the modular links to produce maximum load support, friction and bonding strength. A textured surface (FIGS. 1, 2) extending outwardly from the surface of the high friction material in a set of interconnected ridges will conform resiliently to load bodies in contact therewith for additional functional advantage in conveying different types of loads. The load transport body in the embodiment of FIG. 2 has interdigitatable link end fingers extending from the main body of high friction material to overlap the link end fingers 18 on the basic module (FIG. 1).

The high friction material does not interfere with the favorable drive characteristics of the low friction hard plastic of the basic modular link structure, and therefore serves advantageously with sprocket drive gear transport of the belt. That is, there is no particular forces on the large thermoplastic bonded area that tends to disrupt the unity of the load bearing modular unit, since the load offers basically a downward compression with little shear force that would tend to cause catastrophic failure. Furthermore, the placement of the two diverse materials in the modular link conveyor belts of this invention is such that the hard plastic material is used to contact frictionally wear strips with minimal friction.

In particular, this invention provides two compatible modular links which may be bricklayed in a conveyor belt of desired width to provide separate lanes of either modules with high friction load bearing surfaces to transport loads or with low friction long lasting plastic surfaces that mate with wear strips, typically installed on belt return paths, which would otherwise interfere with high friction surfaces on the load bearing surfaces unitary modules formed from diverse materials supplied by this invention.

Having therefore advanced the state of the art, those novel features believed descriptive of the nature and spirit of the invention are defined with particularity in the following claims.

We claim:

1. A modular link plastic conveyor belt adapted to convey loads up and down inclined surfaces comprising in combination, a plurality of plastic modular link bodies coupled end-to-end to form a conveyor belt, each said link body being formed of a hard wear resistant plastic material having a low coefficient of friction shaped to provide a rigid high strength conveyor link base structure, low-friction belt-supporting load-bearing wear strip surfaces positioned on an outer belt surface in frictional engagement with link bodies moving about a conveyor belt path, each said link body forming pivot aperture means near two opposite ends coupling the bodies pivotably together end-to-end with pivot rods extending through the apertures, thereby to establish high longitudinal belt strength when so coupled end-to-end in a belt of a predeterminable fixed length and presenting an outer low friction contact surface in sliding contact with said belt supporting wear strip surfaces during transport of said conveyor belt, said bodies being shaped to present an outer load carrying surface having a load bearing area presented for frictional contact with a load being carried by the conveyor belt; and a load transport body of a high friction material for presenting a high friction outermost textured contact surface between said load carrying surface and a load carried by said conveyor belt, said high friction material being thermally bonded with said load carrying surface to substantially cover said load bearing area and provide with at least some of said link bodies a unitary integral modular conveyor belt link with a high friction load carrying surface.

2. The conveyor belt system of claim 1 further comprising a conveyor belt having a width of a plurality of lanes of modules bricklayered into a belt configuration including separate lanes of modules formed of low friction material exclusive of said high friction material thereby forming said wear strip surfaces for frictional contact with the low friction load bearing surfaces in said separate lanes of the belt.

3. The modular link of claim 1 wherein the load transport body presents a textured surface pattern extending outwardly from the surface of the high friction material in a set of interconnected ridges that conform resiliently to load bodies in contact therewith.

4. The modular link belt of claim 1, wherein the low friction base body has interdigitatable link end fingers extending from the base body at opposite link ends defining said aperture means for receiving pivot pins wherein the surface of the high friction material is shaped to overlap onto the interdigitatable fingers.

5. The modular link belt of claim 1 further comprising sprocket drive means for transporting said belt wherein the body of low friction material is shaped to form sprocket drive engaging structure for low friction contact transport drive of the conveyor belt from a sprocket drive gear.

6. The modular link belt of claim 1 wherein the low friction link bodies present a substantially continuous longitudinal aperture free planar load bearing area surface of substantially constant width, and the load carrying surface forms a mating substantially planar continuous longitudinal surface bonded to the load bearing area surface of the plastic body.

7. The conveyor belt system defined in claim 1 wherein the plastic bodies have sprocket drive tooth structure for engaging sprocket wheel drive teeth, said system further comprising a sprocket drive system having sprocket wheel teeth engaging the low friction plastic sprocket drive tooth structure of the modular link for transport of the conveyor belt.

8. The conveyor belt system defined in claim 1 further comprising a conveyor belt system having sets of end-to-end coupled said modular links disposed in side by side lanes to form a multiple lane conveyor belt of a width determined by the side-by-side lanes.

9. The conveyor belt system defined in claim 8 wherein the modular links in at least one lane of said conveyor belt consist of said plastic bodies exclusive of said high friction surface whereby the links present said load bearing area with a low friction surface, and wherein the conveyor belt links are connected into an endless loop with a non-loadbearing return path, and further comprising at least one said wear strip surface located in the return path to contact the low friction plastic surface of bodies exclusive of said high friction surface in a belt supporting relationship.

10. A modular conveyor belt link for carrying loads up and down inclined surfaces molded into an integral body from two diverse thermoplastic materials by a first molding step producing and retaining in a first mold piece of a two piece mold a conveyor link belt module of low friction rigid plastic material containing a load supporting surface and by a second molding step thermoplastically molding a body of high friction resilient material to said load supporting surface of the link with a third mold piece thereby to thermally bond the two materials together into an integral new modular link with a high friction load bearing surface for moving loads up and down inclined surfaces.

11. The method of making two different plastic conveyor chain modular links of different characteristics with a common basic mold comprising the steps of: molding a hard, low friction plastic material between two mold cavities comprising a basic mold for retaining the molded modular link and a removable mold for forming the plastic molded modular link to form a first modular link of a base structure of a low friction rigid plastic material which presents a load bearing surface, removing the removable mold piece from the basic mold which retains the molded plastic modular link, mating a third mold piece with the basic mold to thermally bond a further body of high friction thermoplastic rubber material on the load bearing surface of the first module thereby forming in said mated basic and third mold pieces an integral elastomeric conveyance surface configuration superimposed integrally on the molded modular link by thermally bonding the elastomeric configuration to the plastic load bearing surface of the first molded module to produce the second module of different characteristics.

12. An integrally bonded modular link for a plastic conveyor belt system formed in part of a hard wear resistant plastic material providing a low coefficient of friction disposed on an inwardly disposed belt surface thereof and in part of a high friction resilient contact surface material having ridges outwardly extending from an outwardly disposed belt surface for conforming resiliently with load bodies in contact therewith.

13. A link as defined in claim 12 defining at two link ends with said hard plastic material a set of interdigited fingers having a set of pivot pin receiving apertures axially aligned therein disposed between two substantially parallel link sides, wherein said resilient surface material extends to cover said interdigited fingers thereby to produce a substantially continuous longitudinal conveyor load carrying surface along the length of a conveyor belt formed from such links.

* * * * *